(12) United States Patent
Park et al.

(10) Patent No.: US 10,528,622 B2
(45) Date of Patent: Jan. 7, 2020

(54) DISPLAY APPARATUS, BACKGROUND MUSIC PROVIDING METHOD THEREOF AND BACKGROUND MUSIC PROVIDING SYSTEM

(71) Applicant: SAMSUNG ELECTRONICS CO., LTD., Suwon-si (KR)

(72) Inventors: Ji-hun Park, Seoul (KR); Myung-jae Kim, Suwon-si (KR); Young-jun Ryu, Suwon-si (KR); Jang-ho Jin, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 395 days.

(21) Appl. No.: 15/230,607

(22) Filed: Aug. 8, 2016

(65) Prior Publication Data

US 2017/0068730 A1 Mar. 9, 2017

(30) Foreign Application Priority Data

Sep. 4, 2015 (KR) ........................ 10-2015-0125696

(51) Int. Cl.

| | |
|---|---|
| *G06F 17/30* | (2006.01) |
| *G06F 16/683* | (2019.01) |
| *G06F 3/16* | (2006.01) |
| *G06F 16/9535* | (2019.01) |
| *G06F 16/638* | (2019.01) |
| *G11B 27/34* | (2006.01) |

(Continued)

(52) U.S. Cl.
CPC ............ *G06F 16/683* (2019.01); *G06F 3/165* (2013.01); *G06F 16/639* (2019.01); *G06F 16/9535* (2019.01); *G10L 19/018* (2013.01); *G11B 27/102* (2013.01); *G11B 27/34* (2013.01)

(58) Field of Classification Search
None
See application file for complete search history.

(56) References Cited

U.S. PATENT DOCUMENTS 6,084,169 A * 7/2000 Hasegawa ............ G10H 1/0025
84/477 R
7,526,585 B2 * 4/2009 Jeong ................ H04M 1/72522
455/566

(Continued)

FOREIGN PATENT DOCUMENTS

| EP | 2 117 143 A2 | 11/2009 |
|---|---|---|
| JP | 200510664 A | 1/2005 |

(Continued)

OTHER PUBLICATIONS

Communication dated Jan. 30, 2017 issued by European Patent Office in counterpart European Application No. 16180157.6.

(Continued)

*Primary Examiner* — Hung D Le
(74) *Attorney, Agent, or Firm* — Sughrue Mion, PLLC

(57) ABSTRACT

A background music providing method includes storing an audio parameter with respect to background music reproduced while a background music identification mode is being activated, acquiring information on the background music based on the audio parameter when receiving a background music identification command, and transmitting the information on the background music to an external apparatus.

19 Claims, 7 Drawing Sheets

(51) Int. Cl.
*G10L 19/018* (2013.01)
*G11B 27/10* (2006.01)

(56) References Cited

U.S. PATENT DOCUMENTS

| | | | |
|---|---|---|---|
| 8,032,538 B2 | 10/2011 | Iwatsu | |
| 8,185,445 B1* | 5/2012 | Perlmuter | G06Q 30/0601 705/26.1 |
| 2001/0039873 A1* | 11/2001 | Yi | G10H 1/0041 84/610 |
| 2004/0095379 A1* | 5/2004 | Chang | G06Q 10/10 715/727 |
| 2005/0051021 A1* | 3/2005 | Laakso | G07F 17/32 84/615 |
| 2005/0101262 A1* | 5/2005 | Lee | H04M 3/42348 455/76 |
| 2006/0140391 A1* | 6/2006 | Bizjak | H04M 11/022 379/373.01 |
| 2007/0061806 A1* | 3/2007 | Jeong | H04M 1/72522 718/100 |
| 2012/0041954 A1* | 2/2012 | Curtis | H04N 5/783 707/740 |
| 2012/0159327 A1 | 6/2012 | Law et al. | |
| 2012/0159535 A1 | 6/2012 | Gratton et al. | |
| 2012/0215330 A1* | 8/2012 | Perlmuter | G06Q 30/0601 700/94 |
| 2012/0316660 A1* | 12/2012 | Luo | G06F 17/30817 700/94 |

FOREIGN PATENT DOCUMENTS

| | | |
|---|---|---|
| JP | 2006190027 A | 7/2006 |
| JP | 200754229 A | 3/2007 |
| JP | 2010154342 A | 7/2010 |
| JP | 2012235492 A | 11/2012 |
| KR | 1020050108890 A | 11/2005 |
| KR | 1020060114558 A | 11/2006 |
| KR | 1020140087196 A | 7/2014 |
| KR | 1020150041268 A | 4/2015 |

OTHER PUBLICATIONS

Communication dated Oct. 8, 2019 issued by European Patent Office in counterpart European Application No. 16180157.6, total of 6 pages.
Anonymous: "Find Out What Music is Playing with Siri and IPhone", Oct. 7, 2014, XP055626368, Retrieved from the Internet: URL: http://osxdaily.com/2014/10/07/find-what-music-playing-siri-ios/[last retrieved Sep. 26, 2019].

* cited by examiner

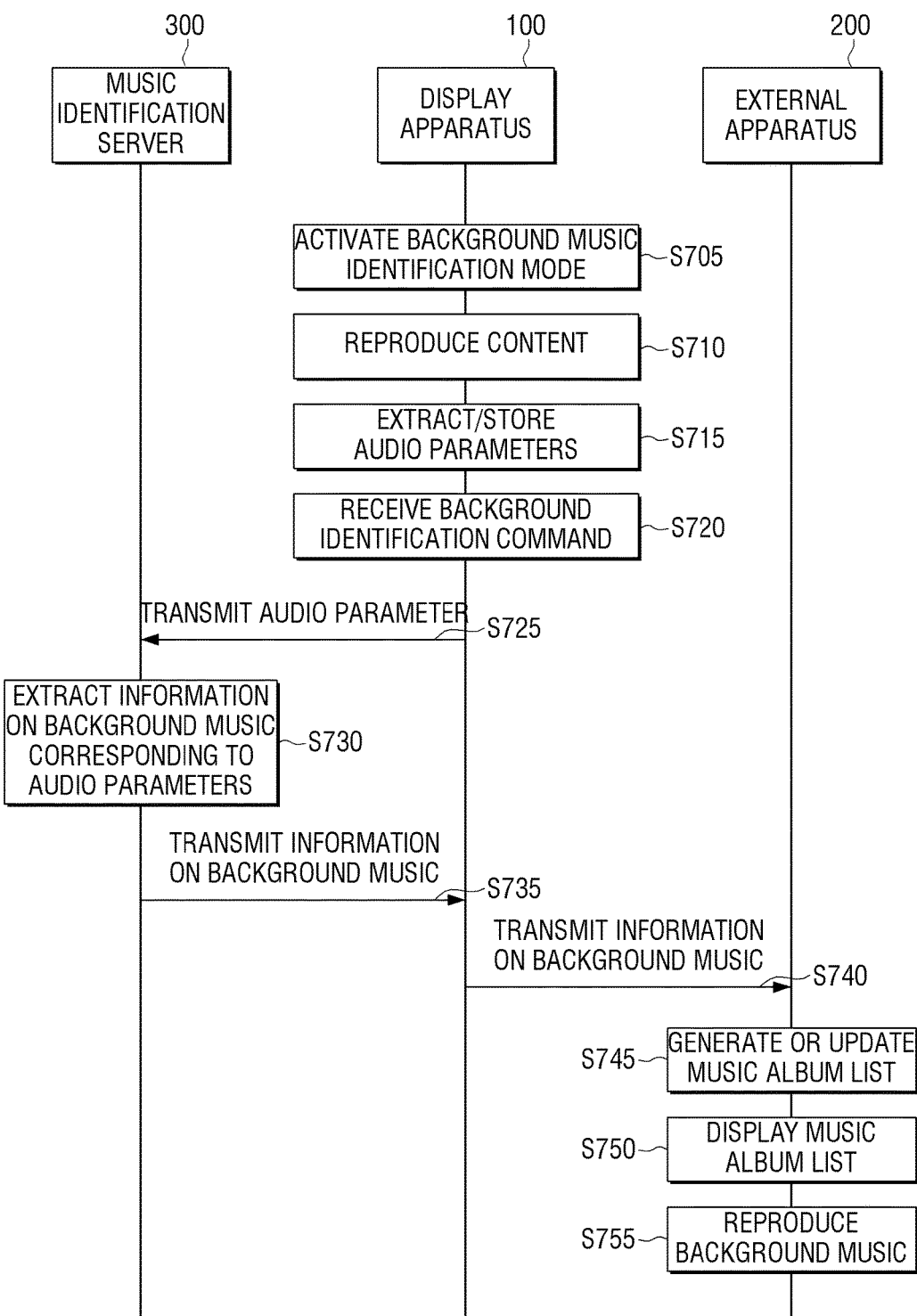

DISPLAY APPARATUS, BACKGROUND MUSIC PROVIDING METHOD THEREOF AND BACKGROUND MUSIC PROVIDING SYSTEM

CROSS-REFERENCE TO RELATED APPLICATION

This application claims priority from Korean Patent Application No. 10-2015-0125696, filed on Sep. 4, 2015 in the Korean Intellectual Property Office, the entire disclosure of which is hereby incorporated by reference.

BACKGROUND

The present disclosure relates to a display apparatus, a background music providing method thereof, and a background music providing system. More particularly, the present disclosure relates to a display apparatus which provides background music through an external apparatus, a background music providing method thereof, a background music providing system.

The background music is music that is inserted to emphasize an atmosphere of a work, such as movie, drama, etc., or to heighten the feeling of the audience, although not expressly presented in the work.

Recently, consumers of background music inserted to content such as a TV program, a movie, etc. has become active, such as retrieving background music of interest while viewing the content and even after viewing the content. Such phenomenon can be easily understood from the fact that an original soundtrack (OST) of a TV program or a movie takes a considerable share in various music charts.

Despite the increasing demand for soundtracks of a program or a movie, to re-listen to a soundtrack that is played during a program or a movie, it is somewhat cumbersome for the user to retrieve information on the music and download the music. In particular, to identify and retrieve information, such as a title of background music in content being viewed, is definitely not easy on the user side.

To overcome such problem, a service which automatically identifies background music included in video content has been introduced, but the corresponding service is to only identify background music being reproduced in real time. Also, the service can only ask the user whether the user wishes to listen to identified background music through an apparatus currently reproducing the content, which interrupts the user from viewing of the content.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to easily provide a display apparatus capable of providing background music included in content without interrupting the user from viewing the content, a background music providing method thereof, and a background music providing system.

According to an embodiment of the present disclosure, a background music providing method of a display apparatus includes storing an audio parameter for at least one background music reproduced while a background music identification mode is being activated, in response to receiving a background music identification command, acquiring information on the at least one background music based on at least one audio parameter, and transmitting the information on the at least one background music to an external apparatus.

The external apparatus may display a music album list that includes the at least one background music based on the information on the at least one background music.

The external apparatus may reproduce at least one background music included in the music album list, in response to a reproduction command being input through the music album list.

The storing may include extracting a fingerprint for each of the at least one background music, and storing the at least one extracted fingerprint.

The acquiring may include transmitting the at least one stored fingerprint to a music identification server, and receiving information on background music corresponding to the each of the at least one fingerprint from the music identification server.

The acquiring may include preferentially acquiring information on background music reproduced at a time when the background music identification command is received.

The method may further include, in response to the information on the at least one background music being transmitted to the external apparatus, temporarily displaying, on part of a screen of the display apparatus, a guide message informing that the external apparatus is capable of checking the background music.

The method may further include generating a music album list that includes the at least one background music based on the acquired information on the at least one background music, and the transmitting may include transmitting the music album list to the external apparatus.

The method may further include reproducing at least one background music included in the music album list.

According to an embodiment of the present disclosure, a display apparatus may include a display configured to display an image, an audio output unit configured to reproduce background music for the image, a communicator configured to communicate with an external apparatus, an input unit configured to receive a user command, storage, and a controller configured to store, on the storage, an audio parameter for at least one background music reproduced while a background music identification mode is being activated, to, in response to receiving a background music identification command through the input unit, acquire information on the at least one background music based on the at least one audio parameter, and to control the communicator to transmit the information on the at least one background music to the external apparatus.

The external apparatus may display a music album list that includes the at least one background music based on the information on the at least one background music.

The external apparatus may, in response to receiving a reproduction command through the music album list, reproduce at least one background music included in the music album list.

The controller may extract a fingerprint for each of the at least one background music and store the at least one extracted fingerprint on the storage.

The communicator may communicate with a music identification server external to the display apparatus, and the controller may transmit the at least one stored fingerprint to the music identification server and control the communicator to receive information on background music corresponding to the at least one fingerprint from the music identification server.

The controller may preferentially acquire information on background music reproduced at a time when the background music identification command is received.

The controller may, in response to the information on the at least one background music being transmitted to the external apparatus, temporarily display, on part of the display, a guide message informing that the external apparatus is capable of checking the background music.

The controller may generate a music album list that includes the at least one background music based on the acquired information on the at least one background music, and transmit the generated music album list to the external apparatus.

The controller may control the audio output unit to reproduce at least one background music included in the music album list.

According to an embodiment of the present disclosure, a background music providing system may comprise a display apparatus and an external apparatus, and the display apparatus may store an audio parameter for at least one background music reproduced while a background music identification mode is being activated, in response to receiving a background music identification command, acquire information on the at least one background music based on the audio parameter for the at least one background music, and transmit the information on the at least one background music to the external apparatus, and the external apparatus may display a music album list that includes the at least one background music based on the information on the at least one background music.

According to the various embodiments of the present disclosure, the user may be easily provided with background music included in content without being interrupted while viewing the content. Also, it will no longer be inconvenient since the user does not need to replay the content to acquire information on background music reproduced already.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain exemplary embodiments of the present disclosure will be more apparent from the following description taken in conjunction with the accompanying drawings, in which:

FIG. 7 illustrates a sequence of a background music providing method of a background music providing system, according to an embodiment of the present disclosure.

Throughout the drawings, like reference numerals will be understood to refer to like parts, components, and structures.

DETAILED DESCRIPTION

Hereinafter, the present disclosure will be described in detail with reference to the accompanying drawings. In the following description, well-known functions or constructions are not described in detail since they would obscure the application with unnecessary detail. Also, the term "unit" is provided or mixed up in use for the ease of preparing the present specification, which does not itself have a distinct meaning or serve a purpose.

Hereinafter, the "unit" refers to a software component or a hardware component, such as FPGA and ASIC, and performs a particular function. However, the "unit" is not limited to software or hardware. The "unit" may consist of a recording medium having an address or may be configured to be executed in one or more processors. Therefore, the "unit" includes components such as a software component, object-targeting software component, class component and working component, and processes a function, attribute, process, sub-routine, intervals of a program code, driver, firmware, microcode, circuit, data, database, table, array and variables. Functions provided by components and units may be combined to a lesser amount of components and units, and may be divided into a larger number of components and units.

Figure 1:
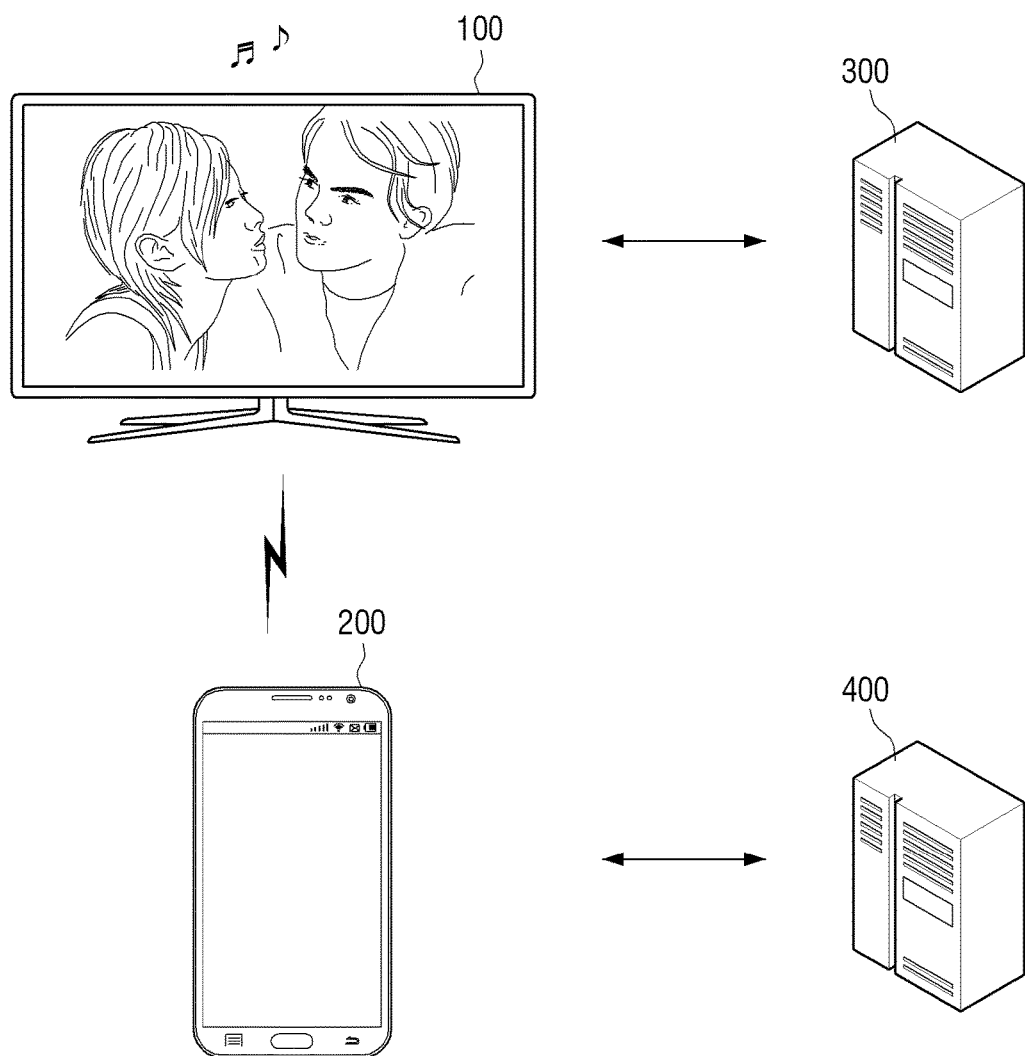
FIG. 1 illustrates an exemplary background music providing system, according to an embodiment of the present disclosure.

FIG. 1 illustrates an exemplary background music providing system, according to an embodiment of the present disclosure. According to FIG. 1, a background music system 10 may include a display apparatus 100, an external apparatus 200, a music identification server 300, and a music server 400.

The display apparatus 100 may reproduce content that includes background music. In particular, the display apparatus 100 may store an audio parameter for the reproduced background music while a background music identification mode is being activated. Here, the background music identification mode is an operational mode of the display apparatus 100 which identifies background music reproduced in the display apparatus 100. While the background music identification mode is being activated, the display apparatus 100 may extract and store the audio parameter of background music being reproduced in the display apparatus 100.

Specifically, the display apparatus 100 may reproduce content while the background music identification mode is activated. Here, the reproduced content may include at least one background music, and the display apparatus 100 may extract audio parameters to identify the respective background music from audio data, and store the same. In this example, the audio parameter may, as a non-limiting example, be a fingerprint that summarizes audio data with respect to background music.

Meanwhile, the display apparatus 100 may, when a background music identification command is received, acquire information on at least one background music based on at least one stored audio parameter. For example, the display apparatus 100 may transmit at least one stored audio parameter to an external music identification server 300 and receive information on background music corresponding to each audio parameter from the music identification server 300 and acquire information on the background music.

The music identification server 300 may store a plurality of audio parameters and information on background music corresponding to the audio parameters. The music identification server 300 may identify background music corresponding to the at least one received audio parameter using the stored information and transmit information on the identified background music to the display apparatus 100. In this example, the background music information may, as non-limiting examples, include a title, artist, genre, composer, lyric writer, title of the album, tracks of the album, cover photo of the album, etc. of the background music.

For this purpose, the display apparatus 100 may connect to the music identification server 300 via various wired or wireless networks, such as the Internet, and transmit or receive information.

Meanwhile, the display apparatus 100 may transmit information on the acquired background music to an external apparatus 200, and the external apparatus 200 may accordingly display a music album list that includes the background music based on the information on the background music received from the display apparatus 100.

Specifically, the external apparatus 200 may generate or edit a music album including the background music using the received information on the background music, or update a pre-generated music album and display the music album list generated, edited or updated as such.

For this purpose, the display apparatus 100 may be connected to the external apparatus 200 and transmit or receive various information in the near field communication method, such as a Bluetooth, a WiFi, etc.

In addition, the external apparatus 200 may reproduce background music according to a reproduction command through the displayed music album list. For example, in the state that a music album list includes background music, when a user selects background music to be reproduced and inputs a reproduction command, the external apparatus 200 may stream music corresponding to the background music from a music server 400 and reproduce the background music; however, it is not limited thereto. The user may also download the corresponding music from the music server 400 and reproduce the downloaded music, or retrieve whether the corresponding music is pre-stored, and if the music is pre-stored, reproduce the music immediately.

Accordingly, the user may be provided with information on background music along with the background music without being interrupted from viewing content reproduced in the display apparatus 100.

It is illustrated in FIG. 1 that the display apparatus 100 is a smart TV, and that the external apparatus 200 is a smartphone, but it is not limited thereto. The display apparatus 100 and the external apparatus 200 of the present disclosure may, for example be any combination of two among a smartphone, a tablet, a laptop PC, a PMP, a phablet, a personal digital assistant (PDA), a desktop PC, an electronic frame, and a smart TV.

The display apparatus 100 does not necessarily have to be an apparatus having a single component. For example, a multimedia reproduction system in which a TV screen reproduces an image of content and a sound bar reproduces background music, the TV and the sound bar being connected to each other, may be included in the scope of the display apparatus 100 according to the present disclosure.

In FIG. 1, it is illustrated that the display apparatus 100 acquires information on background music through the music identification server 300, but the background music providing system 10 is not limited thereto.

For example, the display apparatus 100 may as well store a plurality of audio parameters and information on background music corresponding to each of the audio parameters. In this example, when receiving a background music identification command, the display apparatus 100 may identify background music corresponding to the stored audio parameters from a time point of when the background music identification mode is activated to a time point of when the background music identification command is received, and acquire information on each of the identified music using the stored information, without the need to use the music identification server 300.

Hereinafter, the display apparatus 100 will be described in greater detail according to various embodiments of the present disclosure with reference to FIGS. 2 to 5.

Figure 2:
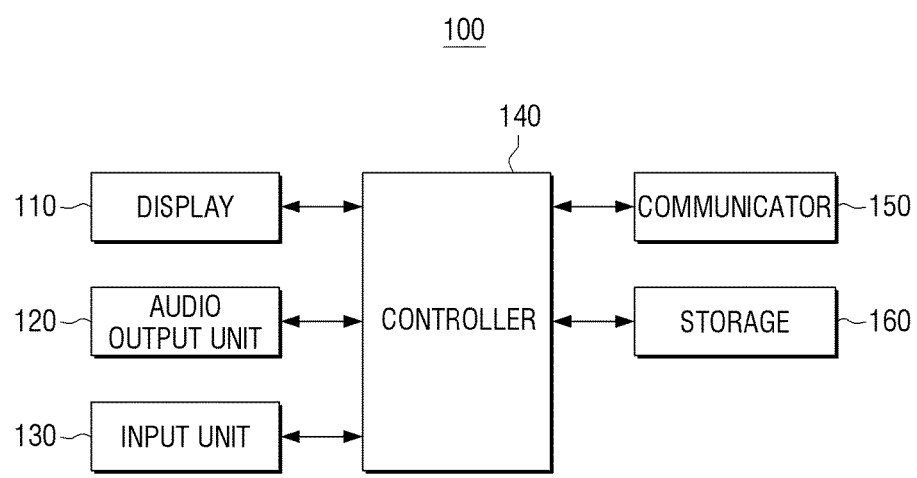
FIG. 2 is a block diagram illustrating a configuration of a display apparatus, according to an embodiment of the present disclosure.

FIG. 2 is a block diagram illustrating a configuration of a display apparatus, according to an embodiment of the present disclosure. According to FIG. 2, a display apparatus 100 includes a display 110, an audio output unit 120, e.g., an audio output device or an audio transmitter, an input unit 130, e.g., an input device or an input receiver, a controller 140, e.g., a microprocessor, a communicator 150, e.g., a communication interface, and a storage 160, e.g., a memory.

The display 110 may display an image input from various sources. For example, the display 110 may display various images included in content, such as images or videos that are input from a broadcasting station or an external apparatus (CD or DVD player, etc.). Also, the display 110 may display a graphics screen, such as a UI generated by the controller 140. In particular, the display 110 may display an image of content including background music. For this purpose, the display 110 may be realized as a display of various forms, such as a liquid crystal display (LCD), an organic light emitting diodes (OLED), a plasma display panel (PDP), etc., and may include a touch screen.

The audio output unit 120 may output audio. In particular, the audio output unit 120 may reproduce background music included in content, and for this purpose, may include speakers, an audio output terminal, etc.

The input unit 130 may receive a user command to control the display apparatus 100. In particular, the input unit 130 may receive a user command to activate or inactivate a background music identification mode, and receive a background music identification command from the user.

In this example, the background music identification mode is a mode which identifies background music included in content that is reproduced through the display 110 and the audio output unit 120. While the background music identification mode is activated, audio parameters with respect to background music included in content reproduced through the display 110 and the audio output unit 120 are extracted and stored.

Meanwhile, the background music identification command is a user command to acquire information on background music. When the user inputs a background music identification command while background music is being reproduced, information on the background music is acquired based on at least one of audio parameters of background music that is reproduced at a time point of when the background music identification command is input and a pre-stored audio parameter (which is extracted and stored while the background music identification mode is activated).

For this purpose, the input unit 130 may be realized to include a button included in the display apparatus 100, a touch panel (when the display 110 is realized as a touch screen), or a remote control signal receiver (when the display apparatus 100 is controlled through an external remote controller, not illustrated), etc.

The communicator 150 may communicate with an external apparatus. In particular, the communicator 150 may be connected with the external apparatus 200, the music identification server 300, and the music server 400, etc. via wire or wirelessly, and transmit or receive various information.

For example, the controller 150 may be connected to the external apparatus 200 in a near field wireless communication method, and transmit, by the controller, information on at least one background music to the external apparatus 200. According to another embodiment of the present disclosure, the communicator 150 may receive a background music reproduction command from the external apparatus 200.

The communicator 150 may be connected to the music identification server 300 through a network, such as the Internet, etc., via wire or wirelessly, transmit audio parameters with respect to at least one background music to the music identification server 300 and receive information on background music corresponding to each audio parameter from the music identification server 300. According to an embodiment, the communicator 150 may be connected to the music sever 400 via wire or wirelessly through a network such as the Internet, etc., and receive music corresponding to the background music.

For this purpose, the communicator 150 may include at least one communication module among a near field wireless communication module (not illustrated) and a wireless LAN communication module (not illustrated). In this example, the near field wireless communication module (not illustrated) is a communication module which performs data communication wirelessly with an external apparatus 200 located nearby, which may be, for example, a Bluetooth module, a ZigBee module, an NFC module, and etc.

The wireless LAN communication module (not illustrated) is a module which connects to and communicates with an external network according to a wireless communication protocol, such as Wi-Fi, IEEE, etc. The communicator 150 may further include a mobile communication module which communicates by accessing a mobile communication network according to various mobile communication standards, such as 3rd Generation (EG), a 3rd Generation Partnership Project (3GPP), a Long Term Evolution (LTE), etc.

The communicator 150 may include at least one of wired communication module (not illustrated), which includes a high-definition multimedia interface (HDMI), a universal serial bus (USB), Institute of Electrical and Electronics Engineers (IEEE) 1394, RS-232, etc.

The storage 160 may store various programs and data to drive the display apparatus 100. In particular, the storage 160 may store audio parameters with respect to at least one background music extracted by the controller 140. In this example, the audio parameters with respect to background music may be extracted in the order of reproduction of background music and stored in the storage 160 in that order. The storage 160 may store information on background music acquired by the controller 140 and store a music album list, etc., generated using the information on the background music. However, according to an embodiment, the storage 160 may as well store music acquired using the information on the background music.

For this purpose, the storage 160 may be realized in various forms, such as RAM, ROM, flash memory, hard disk drive (HDD), a solid state drive (SSD), etc. However, the storage 160 may also include a buffer memory.

The controller 140 may control an overall operation of the display apparatus 100. In particular, the controller 140 may store audio parameters with respect to at least one background music on the storage while the background music identification mode is activated.

Specifically, the controller 140 may, when receiving a background music identification mode activation command through the input unit 130, extract audio parameters with respect to background music included in content being reproduced, until the background music identification mode is subsequently inactivated, and store the extracted audio parameters on the storage 160.

In this example, the audio parameters with respect to background music may, as a non-limiting example, be a fingerprint that is generated by any one of Philips audio fingerprinting algorithm, a Shazam audio fingerprinting algorithm, and a Google audio fingerprinting algorithm. That is, the controller 140 may extract a fingerprint with respect to background music by using any one of the fingerprinting algorithms and store the extracted fingerprint on the storage 160. However, the audio parameter according to the present disclosure is not limited to a fingerprint, and the audio parameters may be anything that is generated by analyzing audio data of background music and can be used for identifying the background music.

Hereinafter, a method for extracting and storing an audio parameter with respect to background music by the controller 140 will be described in greater detail below, provided that an audio parameter is a fingerprint.

In order to extract a fingerprint with respect to background music being reproduced, the controller 140 may divide audio signals of content being reproduced into a background music portion and the other audio signals and generate a fingerprint with respect to the background music using the background music portion, thereby extracting a fingerprint from the reproduced background music.

Specifically, when content including background music is reproduced while a background music identification mode is activated, the controller 140 may extract at least some of audio signals included in the reproduced content. In this example, some of audio signals may, as a non-limiting example, be a pulse code modulation (PCM) signal.

The controller 150 may detect parameters which distinguish between background music and the other audio signals from some of audio signals. In this example, the parameters which distinguish audio signals are to indicate a frequency characteristic of background music, which may include at least one of Mel Frequency Cepstral Coefficient (MFCC), spectral centroid, spectral rolloff, high zero crossing rate ratio (HZCRR), low short time energy ratio (LSTER), spectrum flux (SF), and line spectrum pairs (LSP) distance. Also, the controller 150 may detect phonetic recognition-based parameters, etc.

Accordingly, the controller 150 may distinguish between background music and the other audio signals by applying the detected parameter to any one of Gaussian mixture model (GMM), k-nearest neighbor (k-NN), and hidden Markov model (HMM).

In this example, the Gaussian mixture model (GMM) is a model which constitutes a plurality of Gaussian probability distribution based on parameters and classifies background music from an audio signal according to the Gaussian probability distribution. The k-nearest neighbor (k-NN) is an algorithm which calculates a distance between an audio signal and a parameter, and finds k signals that are close to the parameter and classifies them, in which the closest neighbor (l-NN) corresponds to background music. The hidden Markov model (HMM) is a model which infers hidden parameters from the detected parameters, and classifies background music among them from an audio signal according to a probability distribution.

As described above, when the background music portion is distinguished from the other audio signals, the controller 140 may generate a fingerprint with respect to the background music portion using at least one of the above-mentioned various fingerprint algorithms, to thereby extract a fingerprint with respect to at least one background of music reproduced while a background music identification mode is activated.

Then, the controller 140 may store the extracted fingerprint on the storage 160. In this example, according to an embodiment, the controller 140 may store the extracted fingerprint in a buffer memory in the order of extraction.

Meanwhile, the controller 140 may acquire information on at least one background music based on at least one audio parameter when a background music identification command is received through the input unit 130. Specifically, the controller 140 may, when a background music identification command is received by the input unit 130, control the communicator 150 to transmit at least one audio parameter stored in the storage 160 to a music identification server external to the display apparatus. In this example, the background music identification command may as well be transmitted from the external apparatus 200 according to an embodiment.

The music identification server 300 may store a plurality of audio parameters and information on background music corresponding to each of the audio parameters. Therefore, the music identification server 300 may retrieve information on background music corresponding to each of at least one audio parameter received from the display apparatus 100.

In this example, it may be desirable that the controller 140 should generate audio parameters using an audio parameter generation algorithm having the same format as audio parameters stored in the music identification server 300. For example, if a plurality of audio parameters stored in the music identification server 300 is a fingerprint generated by Philips audio fingerprinting algorithm, it may be desirable that the controller 140 of the display apparatus 100 extract and store a fingerprint with respect to background music using Philips audio fingerprinting algorithm as well.

Accordingly, the controller 140 may receive information on background music corresponding to each of at least one audio parameter from the identification server 300 through the communicator 150 and acquire information on background music. In this example, the information on background music acquired from the music identification server 300 may, as non-limiting examples, include at least one of a title, artist, genre, composer, lyrics writer, title of the album, tracks of the album and cover photo of the album of the corresponding background music.

Figure 3:
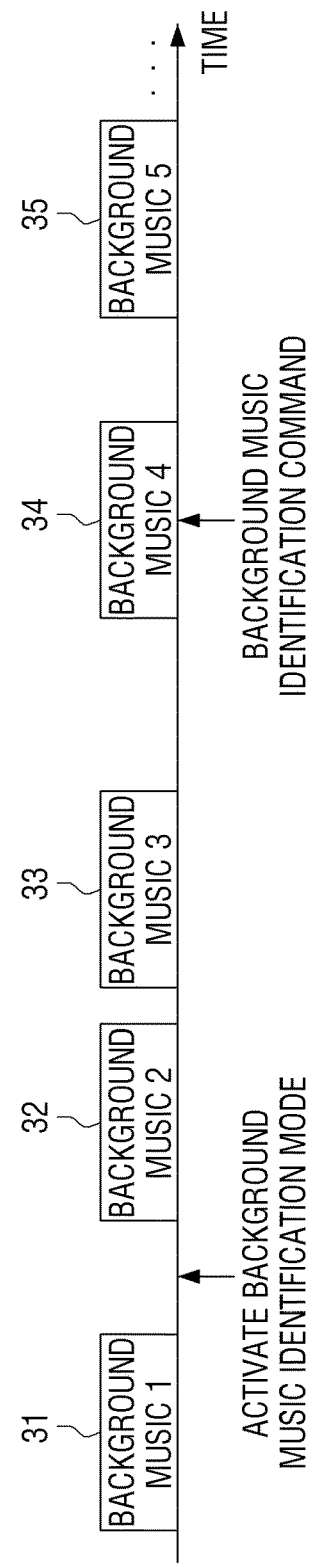
FIG. 3 illustrates exemplary operations of a display apparatus using a background music identification mode and a background music identification command.

Acquiring information on background music will be described in greater detail below, with reference to FIG. 3. FIG. 3 conceptually illustrates how background music is reproduced over time when content including the background music is reproduced.

In the example of FIG. 3, while content is being reproduced, when the user activates a background music identification mode after first background music 31 is reproduced, the controller 130 may respectively extract audio parameters with respect to second background music 32 and third background music 33 which are reproduced after the background music identification mode is activated, to store them on the storage 160.

Subsequently, when a background music identification command is input by the user while fourth background music 34 is being reproduced, the controller 140 may extract audio parameters with respect to the fourth background music 34, and transmit the audio parameters with respect to the second background music 32 and the third background music 33 stored on the storage 160 to the music identification server 300. In this example, the audio parameters extracted with respect to the fourth background music 34 may as well be stored on the storage 160 and transmitted to the music identification server 300.

Accordingly, the music identification server 300 may retrieve information on the second background music 32, the third background music 33 and the fourth background music corresponding to each audio parameter and transmit the retrieved information to the display apparatus 100, and the controller 140 may receive the information through the communicator 150 and acquire information on the second background music 32, the third background music 33, and the fourth background music 34.

In this example, according to an embodiment of the present disclosure, the controller 140 may store audio parameters of the reproduced background music in a buffer memory in the order of extraction, and when a background music identification command is received, transmit the audio parameters to the music identification server 300 in the inverse order of storage.

That is, in the above example, the controller 130 may transmit audio parameters to the music identification server 300 in the order of audio parameters with respect to the fourth background music 34, audio parameters with respect to the third background music 33, and audio parameters with respect to the second background music 32, and accordingly, the music identification server 300 may retrieve information on the corresponding background music in the order of receipt of audio parameters and transmit the retrieved information to the display apparatus 100.

That is because it is highly likely that the background music reproduced in the display apparatus 100 at the time when a user inputs a background music identification command is background music in which the user is most interested, i.e. information for which the user wants to know most about, and thus to preferentially provide information on background music reproduced at the time of when the background music identification command is input. In this example, information on the fourth background music 34 would be preferentially acquired.

Since a background music identification mode is continuously activated in FIG. 3, when a fifth background music 35 is subsequently reproduced, audio parameters with respect to the fifth background music 35 is extracted and stored on the storage 160, and while a sixth background music (not illustrated) is reproduced, when the user inputs a background music identification command again, information on the fifth and sixth background music may be acquired. If a background music identification mode is inactivated by the user after the reproduction of the fourth background music 34, even though it is reproduced from the fifth background music and then on, no audio parameter would be extracted or stored, and thus, information on the background music would not be acquired, either.

The controller 140 may control the communicator 150 to transmit information on at least one background music acquired as above, to an external apparatus 200. Also, the controller may, when it is confirmed that the external apparatus 200 is turned off, transmit a command to turn on the external apparatus 200 to the external apparatus 200 and transmit information on the at least one background music to the external apparatus 200 after turning on the external apparatus 200, according to an embodiment.

Accordingly, the external apparatus 200 may display a music album list including at least one background music based on the information on at least one background music received from the display apparatus 100.

For example, when receiving information on at least one background music from the display apparatus 100, the external apparatus 100 may generate a new music album that includes the received information on background music. Accordingly, automatically or when receiving a user command to select the corresponding album, the external apparatus 200 may display a music album list which lists background music information with respect to each background music.

According to an embodiment, in the state that the external apparatus 200 already has a music album including the background music, when the external apparatus receives information on at least one background music from the display apparatus 100, the external apparatus 100 may update the received information on background music to a music album that includes the generated music album including the background music. Accordingly, automatically or when receiving a user command to select the corresponding music album, the external apparatus 200 may display a music album with updated background music.

According to another embodiment, in the state that the external apparatus 200 has music albums which are categorized into genre, artist, and etc., when the external apparatus 200 receives information on at least one background music from the display apparatus 100, the external apparatus 200 may update the corresponding background music to a music album of a category that corresponds to the received information on the background music.

For example, in the state that a music album X that includes a song by an artist X is pre-generated, and that the received information on background music includes background music by the artist X, the external apparatus 200 may add information (e.g. title of background music) on the background music by the artist X to a music album of the artist X.

Accordingly, automatically or when receiving a user command to select the corresponding music album, the external apparatus 200 may display a music album list with updated background music. In this example, the music album list may include information on music other than the background music as well as information on the background music.

The external apparatus 200 may edit an album including the at least one background music according to a user command. Specifically, the external apparatus 200 may copy or delete information on particular background music onto or from an album including background music according to a user command or move the information to another album.

Meanwhile, the external apparatus 200 may, when a user reproduction command is input through the displayed music album list, reproduce at least one background music included in the music album list. In this example, the external apparatus 200 may be connected to an external music server 400 and stream or download music corresponding to the at least one background music to reproduce the background music.

Specifically, the external apparatus 200 may transmit information on background music to the music server 400, and when the music server 400 retrieves music corresponding to the corresponding background music using the received information on the background music and transmits the retrieved music, receive the music to reproduce or store it. Meanwhile, the external apparatus 200 may, when music corresponding to background music to be reproduced is pre-stored, reproduce the pre-stored music and reproduce the background music.

Figure 4A:
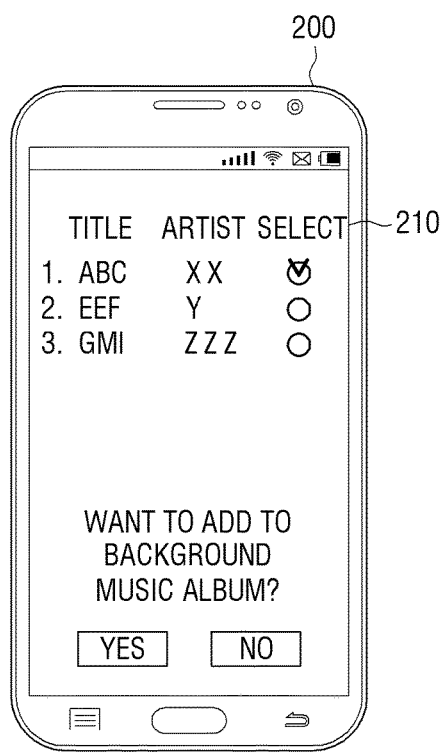
FIGS. 4A and 4B illustrate an example of a music album list being displayed in an external apparatus, according to an embodiment of the present disclosure.
Figure 4B:
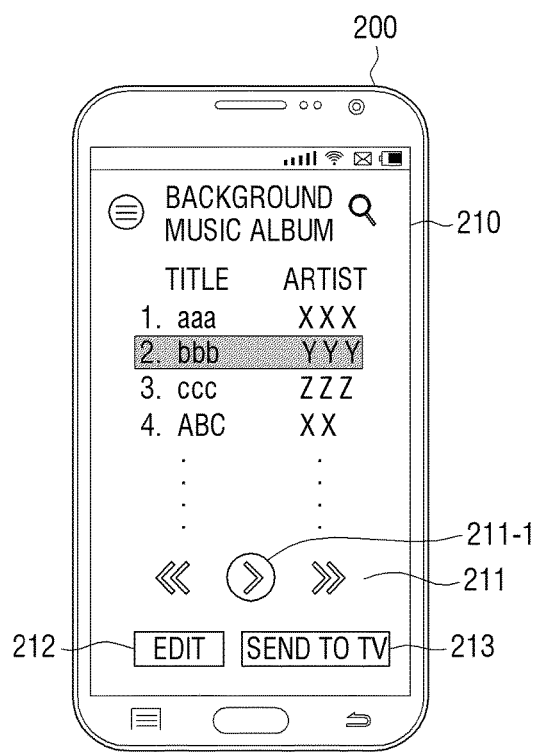

Hereinafter, an example of operations of the external apparatus 200 when information on at least one background music is transmitted from the display apparatus 100 to the external apparatus 200 will be described with reference to FIG. 4. FIG. 4A illustrates an example that information on at least one background music is displayed on a screen 210 of the external apparatus 200, and FIG. 4B illustrates an example that a music album list including background music is displayed on the screen 210.

Specifically, when information on at least one background music is transmitted from the display apparatus 100 to the external apparatus 200, the external apparatus 200 may receive the information and display the received information on each background music as in FIG. 4A. Accordingly, the user may minimize interruption in viewing of content being reproduced in the display apparatus 100 and receive information on the background music.

According to an embodiment, when receiving information on at least one background music from the display apparatus 200, the external apparatus 200 may as well generate an alert sound or vibration to inform the user that background music has been identified. Accordingly, the user may be aware of the fact that the information on the background music may be identified in the external apparatus 200.

According to FIG. 4A, it can be understood that background music with the title ABC by artist XX, background music with the title EEF by artist Y and background music with the title GMI by artist Z are identified and transmitted from the display apparatus 100.

Meanwhile, the external apparatus 200 may display a UI to select background music to be added to a background music album and a message asking whether to add the selected background music to the album. Accordingly, the user may select and add background music to be added to the music album from among at least one background music identified and transmitted from the display apparatus 100.

According to the example of FIG. 4A, a user may see that background music having the title ABC by artist XX is selected. Accordingly, when the user inputs an additional command (YES), information on the corresponding background music will be added to a background music album list. As illustrated in FIG. 4B, background music with the title ABC by the artist XX is added to the fourth track of the background music album list.

The electronic apparatus 100 may display a background music album list as in FIG. 4B. In this example, the displayed background music album list may include a UI 211 which receives a reproduction manipulation command and a UI 212 which edits a music album list.

Accordingly, the user may select background music to be reproduced from among the displayed background music album list and input a reproduction command through a play button 211-1, and listen to the selected background music. Referring to FIG. 4B, the user selects background music with the title of bbb by artist YYY and thus, when the user inputs the play key 211-1, the external apparatus 200 may transmit information on the background music with the title bbb by artist YYY to an external music server 400, and receive the music to reproduce the music.

Also, when the user selects an edit key 212, the external apparatus 200 may display an edit UI (not illustrated) of a music album list, and perform the above-described various editing operations according to a user command input through the edit UI (not illustrated).

According to FIG. 4B, a music album list screen 210 may include a UI 213 for performing a function of transmitting music to the display apparatus 100. The display apparatus 100 and the external apparatus 200 may be connected to each other via various communication methods and thus, according to an embodiment, when the user selects a transmission UI 213 to TV to reproduce background music in the display apparatus 200, the external apparatus 200 may transmit music corresponding to the selected background music to the display apparatus 100, and thereby the user may listen to the background music in the display apparatus 100.

In this example, music which is transmitted from the external apparatus 200 to the display apparatus 100 may, as a non-limiting example, be music that the external apparatus 200 received from the music server 400 or music pre-stored in the external apparatus 200.

Returning to the controller 140 of FIG. 2, according to an embodiment, the controller 140 may, when information on at least one background music is acquired and transmitted to the external apparatus 200 according to a background music identification command by a user, temporarily display a guide message informing that the background information may be identified in the external apparatus 200 on part of the display 110. In this example, temporarily displaying a guide message in part of the display 110 is to minimize interruption to viewing of content of a user.

Figure 5:
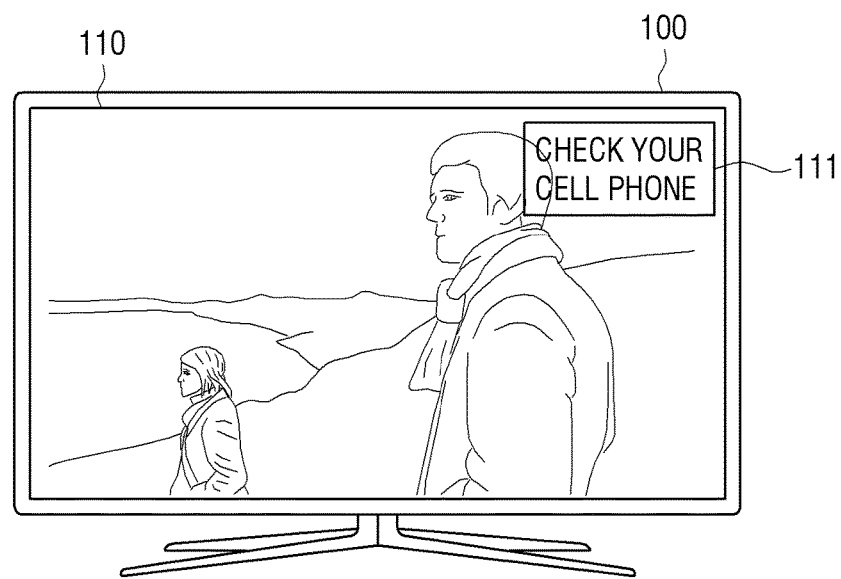
FIG. 5 illustrates an example of a guide message being displayed in a display apparatus, according to an embodiment of the present disclosure.

FIG. 5 illustrates an example that a guide message 111 is displayed on a display 110 of a display apparatus 100. That is, when information on background information is acquired by the display apparatus 100, the information is not displayed on the display apparatus 100, but transmitted to the external apparatus 200 and displayed in the external apparatus 200 as described above. Also, as illustrated in FIG. 5, a guide message such as "check your cell phone" is temporarily displayed in part of the display 110 of the display apparatus 110, minimizing interruption to a user viewing content.

However, the methods for minimizing the interruption to a user viewing content are not limited thereto. For example, the controller 140 may, when acquiring information on at least one background music according to a background music identification command of a user, only display information on background music being reproduced at the time when the background music identification command is received, and control the display 110 and the communicator 150 to transmit the information on at least one background music to the external apparatus 200. In this example, the controller 140 may display only brief information such as a title and artist of the corresponding background music on part of the display 110.

With respect to background music being reproduced at the time when the user inputs a background music identification command, it is likely that the user wants to know immediately information regarding the music and thus, through the above-described embodiment, information that the user wants to know may be provided while minimizing interruption on the user viewing content.

According to another embodiment, the controller 140 may generate a music album list including at least one background music based on acquired information on at least one background music, and transmit the generated music album list to the external apparatus 200. Specifically, since the display apparatus 100 has acquired information on background music, the controller 140 may generate a music album list including background music and transmit the generated music album list to the external apparatus 200, instead of immediately transmitting the acquired information on background music directly to the external apparatus 200.

For example, the controller 140 may generate a new music album including the acquired background music information. Also, according to an embodiment, when a music album including background music is pre-stored in the display apparatus 100, the controller 140 may update information on the acquired background music to a music album including the pre-generated background music. Also, according to another embodiment, when a music album in the display apparatus 100 is categorized by genre, artist, and etc., and pre-generated, the controller 140 may update the corresponding background music to a music album of a category corresponding to the acquired background music information.

The controller 140 may transmit a music album list generated or updated as such, to the external apparatus 200. Accordingly, the external apparatus 300 may display the music album list received from the display apparatus 100.

According to an embodiment of the present disclosure, the display apparatus 200 may reproduce at least one background music included in a music album list. For example, as described in FIG. 4B, when music corresponding to background music is transmitted from the external apparatus 200 via a UI 213 for transmitting music to the display apparatus 100, the controller 140 may receive the music via the communicator 150 to reproduce the background music.

According to another embodiment, the controller 140 may generate a music album list including background music as described above, to reproduce at least one background music included in the generated music album list. Specifically, the controller 140 may display the generated music album list, and when a reproduction command is input on the music album list through the input unit 130, transmit information on at least one background music included in the music album list to the music server 400, and receive music corresponding to the background music from the music server 400 and reproduce the background music.

Figure 6:
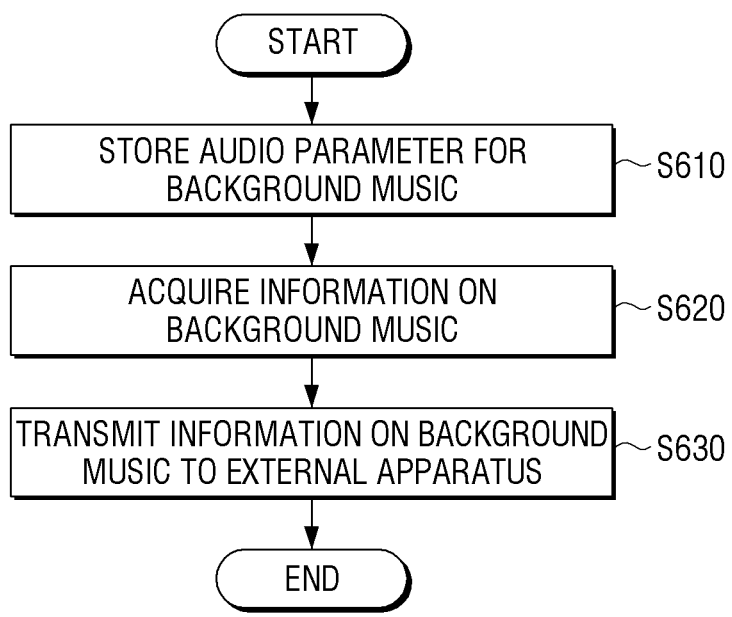
FIG. 6 illustrates a flow of a background music providing method of a display apparatus, according to an embodiment of the present disclosure.

FIG. 6 is a flowchart which shows a method for providing background music of the display apparatus 100, according to an embodiment of the present disclosure. According to FIG. 6, the display apparatus 100 may store S610 an audio parameter with respect to at least one background music reproduced in the display apparatus 100 while a background music identification mode is being activated.

For example, when the audio parameter is a fingerprint, the display apparatus 100 may extract a fingerprint with respect to background music reproduced while the background music identification mode is being activated using at least one of the above-described various fingerprinting algorithms, and store the extracted fingerprint with respect to the background music.

Subsequently, when a background music identification command is received, the display apparatus 100 may acquire S620 information on at least one background music based on the at least one stored audio parameter. Specifically, the display apparatus 100 may transmit the at least one stored audio parameter to an external music identification server 300, and when the background music is identified in the music identification server 300 and information on background music corresponding to each of the audio parameters is transmitted, receive the information and acquire information on background music corresponding to the audio parameters.

In this example, the display apparatus 100 may preferentially acquire information on background music being reproduced at the time when a background music identification command is received. Specifically, the display apparatus 100 may extract audio parameters with respect to background music reproduced while the background music identification mode is activated in the order of reproduction, and store the extracted audio parameters in a buffer memory. Then, when a background music identification command is received, the display apparatus 100 may transmit the audio parameters to the music identification server 300 in the inverse order of that the audio parameter is stored in the buffer memory. In this example, the audio parameters transmitted to the music identification server 300 may be deleted from the buffer memory.

Accordingly, when the music identification server 300 receives the audio parameters, the music identification server 300 may retrieve information on background music corresponding to the audio parameters in the order of reception, and transmit the retrieved information to the display apparatus 100. Accordingly, the display apparatus 100 may preferentially acquire information on background music reproduced at the time when the background music identification command is received.

As such, when information on at least one background music is acquired, the display apparatus 100 may transmit S630 the at least one acquired background music information to the external apparatus 100. In this example, the display apparatus 100 may, when the information on at least one background music is transmitted to the external apparatus 200, temporarily display a guide message informing that the background music may be checked in the external apparatus 200 on part of a screen of the display apparatus.

Accordingly, the external apparatus 200 may generate or update a music album including at least one background music based on information on the at least one background music and display a music album list including the generated or updated background music.

According to an embodiment, the display apparatus 100 may generate or update a music album list including at least one background music using information on background music. Accordingly, when the display apparatus 100 transmits the generated and updated music album list to the external apparatus 200, the external apparatus 200 may receive the music album list and display the music album list including the background music.

When background music is selected on the music album list displayed on the external apparatus 200, and a reproduction command is input with respect to the selected background music, the external apparatus 200 may reproduce the selected background music. Specifically, the external apparatus may receive music with respect to the selected background music from the external music server 400 and reproduce the corresponding background music. In this example, the external apparatus 200 may reproduce the background music by streaming music by accessing a webpage provided by a contents provider (CP) managing the music server 400 or downloading the music itself; however, the method that the external apparatus 200 acquires and reproduces music with respect to background music is not limited thereto.

According to an embodiment of the present disclosure, the display apparatus 100 may reproduce at least one background music included in a music album list. Specifically, when a music album list including background music is generated or updated in the display apparatus 100, the display apparatus 100 may display the generated or updated music album list, and when a reproduction command is input through the displayed music album list, reproduce at least one background music. In this example, the display apparatus 100 may acquire music with respect to background music by communicating with the external music server 400.

Also, the display apparatus 100 may reproduce the background music by receiving music with respect to the background music from the external apparatus 200.

FIG. 7 is a sequential diagram showing a background music providing method of a background music providing system including a display apparatus 100, an external apparatus 200, and a music identification server 300. The description which overlaps with the description of FIGS. 1 through 6 will be omitted herein.

According to FIG. 7, when a background music identification modes is activated, at operation S705, in the display apparatus 100, and content including at least one background music is reproduced at operation S710, the display apparatus 100 may extract audio parameter with respect to reproduced background music and store, at operation S715, the same. Subsequently, when a background music identification command is received at operation S720, the display apparatus may transmit the stored audio parameter to a music identification server 300 at operation S725.

Accordingly, when the music identification server 300 extracts, at operation S730, information on background music corresponding to the received audio parameter using a pre-stored table (for example, table in which audio parameter and information on background music are mapped to each other) and transmits the extracted background music information to the display apparatus 100 at operation S735, the display apparatus 100 may transmit the acquired background music information to the external apparatus 200 at operation S740.

Accordingly, the external apparatus 200 may generate or update, at operation S745, a music album list including at least one background music based on the received background music information and display the generated or updated music album list at operation S750. Also, the external apparatus 200 may reproduce background music according to a user background music reproduction command through the displayed music album list at operation S755.

According to the above various embodiments, the user may be easily provided with background music included in content without being interrupted from viewing the content. Also, it would not be inconvenient for a user since the user does not need to reproduce the content again to acquire information on background music already reproduced.

Meanwhile, according to the above-described various embodiments, an operation of the controller 140 of the display apparatus 100 or methods of providing background music of the display apparatus may be generated as software and provided in the display apparatus 100.

For example, a non-transitory computer readable medium may be installed to include a program which performs a background music providing method including storing audio parameters with respect to at least one background music reproduced while a background music identification mode is being activated, and acquiring information on at least one background music based on the at least one audio parameter when receiving a background music identification command, and transmitting the information on the at least one background music to an external apparatus.

The computer readable medium may include a program command, a data file, a data structure, etc., taken alone or in combination. Program commands recorded on the medium may be those that are specially designed and configured for the present disclosure, or may be well known and usable by those skilled in the art in the field of a computer software. The computer readable recording medium includes, as non-limiting examples, magnetic media, such as a hard disc, a floppy disc, and a magnetic tape, optical media, such as CD-ROM and DVD, magneto-optical media, such as a floptical disc, and a hardware device specially configured to store and perform program commands, such as ROM, RAM, flash memory, etc.

Although example embodiments of the present disclosure have been illustrated and described, it should be understood that the present disclosure is not limited to the disclosed embodiments and may be variously changed without departing from the spirit and the scope of the present disclosure. Therefore, the present disclosure should be construed as including all the changes, equivalents, and substitutions included in the spirit and scope of the present disclosure.

What is claimed is:

1. A method for providing background music of a display apparatus, the method comprising:
    reproducing content including a background music, on the display apparatus;
    based on receiving a user command for activating a music identification mode obtaining, from the background music, an audio parameter corresponding to the background music while the music identification mode is being activated;
    transmitting the audio parameter to an external source;
    obtaining information about the background music based on the audio parameter, from the external source; and
    displaying a screen including the obtained information about the background music, on the display apparatus.

2. The method as claimed in claim 1, further comprising:
    transmitting the obtained information to an external apparatus; and
    displaying, by the external apparatus, a music album list that includes the background music based on the transmitted information.

3. The method as claimed in claim 2, further comprising:
    reproducing, by the external apparatus, the background music included in the music album list, based on a reproduction command being input through the music album list.

4. The method as claimed in claim 2, further comprising:
    temporarily displaying, on a part of the display apparatus, a guide message informing that the background music is confirmable on the external apparatus, in response to the information on the background music being transmitted to the external apparatus.

5. The method as claimed in claim 1, wherein the obtaining the audio parameter comprises:
    extracting a fingerprint for the background music from the background music; and
    storing the extracted fingerprint.

6. The method as claimed in claim 5, wherein the obtaining the information comprises:
    transmitting the fingerprint to a music identification server; and
    receiving the information, from the music identification server.

7. The method as claimed in claim 1, wherein the content includes a plurality of background music pieces, the background music being one of the plurality of background music pieces, and
    the obtaining the information comprises preferentially obtaining the information on a background music piece reproduced at a time when a background music identification command for obtaining the information is received, from the plurality of background music pieces.

8. The method as claimed in claim 1, further comprising:
    generating a music album list that includes the background music based on the obtained information, and
    transmitting the music album list to an external apparatus.

9. The method as claimed in claim 1, further comprising:
    reproducing, by the display apparatus, the background music received from an external content server, the background music corresponding to the obtained information included in the displayed screen.

10. A display apparatus comprising:
    a display;
    a communicator;
    an input unit configured to receive a user command; and
    a controller configured to:
        control the display to display content including a background music,
        based on receiving, through the input unit, a user command for activating a music identification mode, obtain from the background music, an audio parameter corresponding to the background music while the music identification mode is being activated,
        control the communicator to transmit the audio parameter to an external source,
        obtain information about the background music based on the audio parameter from the external source, and
        control the display to display a screen including the obtained information about the background music.

11. The display apparatus as claimed in claim 10, wherein the controller is further configured to control the communicator to transmit the obtained information to an external apparatus, and
    wherein the external apparatus is configured to display a music album list that includes the background music based on the transmitted information on the background music.

12. The display apparatus as claimed in claim 11, wherein the external apparatus is further configured to reproduce the background music included in the music album list, based on receiving a reproduction command through the music album list.

13. The display apparatus as claimed in claim 11, wherein the controller is further configured to temporarily display, on a part of the display, a guide message informing that the background music is confirmable on the external apparatus, in response to the information on the background music being transmitted to the external apparatus.

14. The display apparatus as claimed in claim 10, wherein the controller is further configured to extract a fingerprint for the background music from the background music, and store the extracted fingerprint in a storage.

15. The display apparatus as claimed in claim 14, wherein the controller is further configured to control the communicator to transmit the fingerprint to a music identification server, and control the communicator to receive the information from the music identification server.

16. The display apparatus as claimed in claim 10, wherein the content includes a plurality of background music pieces, the background music being one of the plurality of background music pieces, and the controller is further configured to preferentially obtain the information on a background music piece reproduced at a time when a background music identification command for obtaining the information is received, from the plurality of background music pieces.

17. The display apparatus as claimed in claim 10, wherein the controller is further configured to generate a music album list that includes the background music based on the obtained information, and transmit the generated music album list to an external apparatus.

18. The display apparatus as claimed in claim 17, further comprising an audio output unit, wherein the controller is further configured to control the audio output unit to reproduce the background music received from an external content server, the background music corresponding to the obtained information included in the displayed screen.

19. A background music providing system comprising:
an external apparatus; and
a display apparatus configured to:
reproduce content including a background music,
based on receiving a user command for activating a music identification mode obtain, from the background music, an audio parameter corresponding to the background music while the music identification mode is being activated,
transmit the audio parameter to an external source,
obtain information about the background music based on the audio parameter, from the external source,
display a screen including the obtained information about the background music, and
transmit the obtained information to the external apparatus,
wherein the external apparatus is configured to display a music album list that includes the background music based on the transmitted information on the background music.

* * * * *

UNITED STATES PATENT AND TRADEMARK OFFICE
CERTIFICATE OF CORRECTION

PATENT NO. : 10,528,622 B2
APPLICATION NO. : 15/230607
DATED : January 7, 2020
INVENTOR(S) : Park et al.

Page 1 of 1

It is certified that error appears in the above-identified patent and that said Letters Patent is hereby corrected as shown below:

In the Claims

In Claim 1, Column 17, Line 31, delete "mode obtaining" and insert --mode, obtaining,--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*